(12) United States Patent
Diab et al.

(10) Patent No.: US 8,660,034 B2
(45) Date of Patent: Feb. 25, 2014

(54) METHOD AND SYSTEM FOR MONITORING ACTIVITY OF A REMOTE LINK PARTNER TO TRIGGER TRAINING OF ETHERNET CHANNELS TO SUPPORT ENERGY EFFICIENT ETHERNET NETWORKS

(75) Inventors: Wael William Diab, San Francisco, CA (US); Patricia Ann Thaler, Carmichael, CA (US)

(73) Assignee: Broadcom Corporation, Irvine, CA (US)

( * ) Notice: Subject to any disclaimer, the term of this patent is extended or adjusted under 35 U.S.C. 154(b) by 185 days.

(21) Appl. No.: 12/049,015

(22) Filed: Mar. 14, 2008

(65) Prior Publication Data

US 2009/0097392 A1    Apr. 16, 2009

Related U.S. Application Data

(60) Provisional application No. 60/979,433, filed on Oct. 12, 2007.

(51) Int. Cl.
H04L 12/28    (2006.01)

(52) U.S. Cl.
USPC ............................ 370/255; 370/201; 370/252

(58) Field of Classification Search
USPC ......................... 370/252, 255, 201
See application file for complete search history.

(56) References Cited

U.S. PATENT DOCUMENTS

| | | | |
|---|---|---|---|
| 6,795,450 | B1 | 9/2004 | Mills et al. |
| 2005/0030808 | A1* | 2/2005 | Brown et al. ............... 365/222 |
| 2006/0034295 | A1 | 2/2006 | Cherukuri et al. |
| 2007/0076722 | A1* | 4/2007 | Ungerboeck et al. ...... 370/395.2 |
| 2007/0208819 | A1* | 9/2007 | Talbot et al. ............... 709/208 |
| 2007/0269022 | A1* | 11/2007 | Taich et al. ................ 379/27.01 |
| 2007/0280239 | A1 | 12/2007 | Lund |
| 2009/0125735 | A1 | 5/2009 | Zimmerman |

* cited by examiner

*Primary Examiner* — Omer Mian
(74) *Attorney, Agent, or Firm* — Duane S. Kobayashi

(57) ABSTRACT

It may be determined via monitoring whether a first link partner and/or a second link partner coupled via an Ethernet link has trained or refreshed circuitry and/or has updated at least one parameter. Based on the determination, a corresponding link partner may be trained, refreshed and/or updated. One or more of an echo canceller, a far-end crosstalk canceller and a near-end crosstalk canceller for one or more channels may be configured based on the training, refreshing and/or updating. One or more channels may be silent and/or one or more may be active. Link partners may communicate via one or more of in-band signaling, out-of-band signaling to determine which link partner may monitor and/or which may control or initiate operation. The controlling link partner may be assigned a master mode of operation. Training, refreshing and/or updating for the monitoring link partner may be based on a timer.

19 Claims, 4 Drawing Sheets

METHOD AND SYSTEM FOR MONITORING ACTIVITY OF A REMOTE LINK PARTNER TO TRIGGER TRAINING OF ETHERNET CHANNELS TO SUPPORT ENERGY EFFICIENT ETHERNET NETWORKS

CROSS-REFERENCE TO RELATED APPLICATIONS/INCORPORATION BY REFERENCE

This application makes reference to and claims priority to U.S. Provisional Application Ser. No. 60/979,433, filed on Oct. 12, 2007, entitled "Method and System for Energy Efficient Ethernet," which is hereby incorporated herein by reference in its entirety.

FIELD OF THE INVENTION

Certain embodiments of the invention relate to networking. More specifically, certain embodiments of the invention relate to a method and system for monitoring activity of a remote link partner to trigger training of Ethernet channels to support energy efficient Ethernet networks.

BACKGROUND OF THE INVENTION

With the increasing popularity of electronics such as desktop computers, laptop computers, and handheld devices such as smart phones and PDA's, communication networks, and in particular Ethernet networks, are becoming an increasingly popular means of exchanging data of various types and sizes for a variety of applications. In this regard, Ethernet networks are increasingly being utilized to carry, for example, voice, data, and multimedia. Accordingly more and more devices are being equipped to interface to Ethernet networks.

As the number of devices connected to data networks increases and higher data rates are required, there is a growing need for new transmission technologies which enable higher data rates. Conventionally, however, increased data rates often result in significant increases in power consumption.

New transmission technologies enable higher transmission rates over copper cabling infrastructures. Various efforts exist in this regard, including technologies that enable transmission rates that may even reach 100 Gigabit-per-second (Gbps) data rates over existing cabling. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling 100 m in length. With each 10× rate increase more sophisticated signal processing is required to maintain the 100 m standard cable range. Non-standard transmission rates comprise 2.5 Gbps as well as 5 Gbps.

The specification for 10 Gigabit-per-second (Gbps) Ethernet transmissions over twisted-pair cabling (10GBASE-T) is intended to enable 10 Gbps connections over twisted-pair cabling at distances of up to 182 feet for existing cabling, and at distances of up to 330 feet for new cabling, for example. To achieve full-duplex transmission at 10 Gbps over four-pair twisted-pair copper cabling, elaborate digital signal processing techniques are needed to remove or reduce the effects of severe frequency-dependent signal attenuation, signal reflections, near-end and far-end crosstalk between the four pairs, and external signals coupled into the four pairs either from adjacent transmission links or other external noise sources. New IEEE cabling specifications are being considered for 40 Gbps and 100 Gbps rates.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for monitoring activity of a remote link partner to trigger training of Ethernet channels to support energy efficient Ethernet networks, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1:
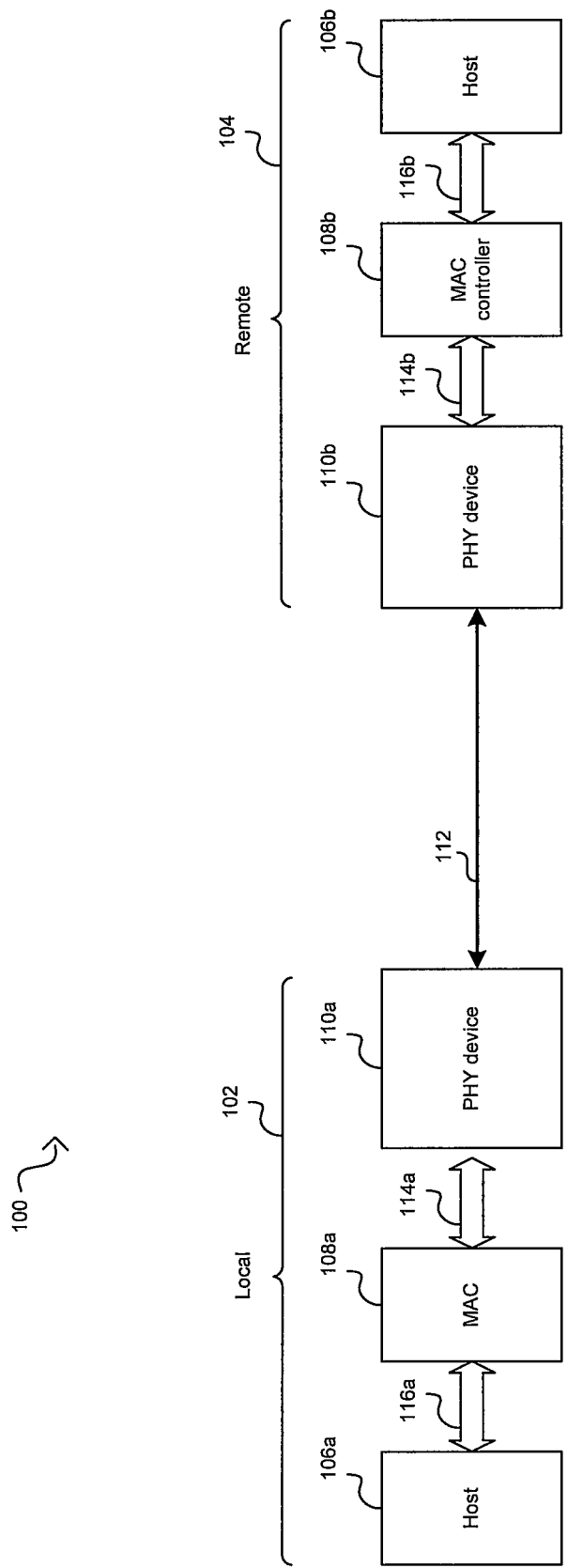
FIG. 1 is a block diagram illustrating an Ethernet connection between a local link partner and a remote link partner, in accordance with an embodiment of the invention.

Certain embodiments of the invention may be found in a method and system for monitoring activity of a remote link partner to trigger training of Ethernet channels to support energy efficient Ethernet networks. An Ethernet link may comprise a plurality of channels wherein one or more channels may be active and/or one or more channels may be silent or set to a lower power. For example, silent channels may have a rate of zero. The Ethernet link partners may be enabled to support transitioning between lower power states and active channel states so as to provide energy efficient Ethernet communication. The Ethernet link partners may support symmetric or asymmetric data rates. Ethernet link partners may train or refresh circuits and/or may update one or more parameters for the plurality of channels. In this regard, training or refreshing the link partners and/or updating one or more parameters may enable or enhance communications for variable operating conditions such as type of cabling and/or length of cabling or for environmental conditions. For example environmental conditions may comprise temperature changes and/or electromagnetic coupling such as noise received from far-end and/or near-end neighboring cabling known as alien FEXT and alien NEXT respectively.

In an Ethernet link, a first link partner and a second link partner may be communicatively coupled via one or more channels wherein one or more channels may be silent and/or one or more channels may be active. The first link partner may train or refresh circuitry and/or update parameters for one or more silent channels. The second link partner may monitor activity by the first link partner. If the second link partner determines that the first link partner has performed training, refreshing and or updating of parameters, the second link partner may also perform training, refreshing and/or updating of parameters for the one or more channels. For one or more of the channels, the parameters may be updated and/or the link partners may be trained or refreshed for one or more of an echo canceller, a far-end crosstalk canceller and/or a near-end crosstalk canceller. In some embodiments of the invention the first link partner and/or the second link partner may change roles with regard being the first to perform training, refreshing and/or updating one or more parameters and the one to monitor the other link partner. In addition, based on prior events, the link partners may determine and/or communicate which link partner may be first to perform training or refreshing activity and/or update parameters and which link partner may be the monitoring link partner. For example, a link partner that initiates an action such as transitioning from an active state to a silent state may be the link partner first to perform training activity. In addition, the link partners may communicate information regarding which link partner will be the first to perform training activity and/or update parameters via one or more of in-band signaling, out-of-band signaling and packet data.

FIG. 1 is a block diagram illustrating an Ethernet connection between a local link partner and a remote link partner, in accordance with an embodiment of the invention. Referring to FIG. 1, there is shown a system 100 that comprises a local link partner 102 and a remote link partner 104. The local link partner 102 and the remote link partner 104 may communicate via a cable 112. In an exemplary embodiment of the invention, the cable 112 may comprise up to four or more channels, each of which may, for example, comprise an unshielded twisted pair (UTP). The local link partner 102 and the remote link partner 104 may communicate via two or more channels comprising the cable 112. For example, Ethernet over twisted pair standards 10Base-T and 100Base-TX may utilize two pairs of UTP while Ethernet over twisted pair standards 1000Base-T and 10 GBase-T may utilize four pairs of UTP.

In an exemplary embodiment of the invention, the link partners 102 and/or 104 may comprise a twisted pair PHY capable of operating at one or more standard rates such as 10 Mbps, 100 Mbps, 1 Gbps, and 10 Gbps (10BASE-T, 100GBASE-TX, 1GBASE-T, and/or 10GBASE-T); potentially standardized rates such as 40 Gbps and 100 Gbps; and/or non-standard rates such as 2.5 Gbps and 5 Gbps.

In an exemplary embodiment of the invention, the link partners 102 and/or 104 may comprise a backplane PHY capable of operating at one or more standard rates such as 10 Gbps (10GBASE-KX4 and/or 10GBASE-KR); potentially standardized rates such as 40 Gbps and 100 Gbps and/or non-standard rates such as 2.5 Gbps and 5 Gbps.

In an exemplary embodiment of the invention, the link partners 102 and/or 104 may comprise an optical PHY capable of operating at one or more standard rates such as 10 Mbps, 100 Mbps, 1 Gbps, and 10 Gbps; potentially standardized rates such as 40 Gbps and 100 Gbps; and/or non-standardized rates such as 2.5 Gbps and 5 Gbps. In this regard, the optical PHY may be a passive optical network (PON) PHY.

The local link partner 102 may comprise a host 106a, a medium access control (MAC) controller 108a, and a PHY device 104a. The remote link partner 104 may comprise a host 106b, a MAC controller 108b, and a PHY device 110b. Notwithstanding, the invention is not limited in this regard. In various embodiments of the invention, the link partner 102 and/or 104 may comprise, for example, computer systems or audio/video (A/V) enabled equipment. In this regard, A/V equipment may, for example, comprise a microphone, an instrument, a sound board, a sound card, a video camera, a media player, a graphics card, or other audio and/or video device. Additionally, the link partners 102 and 104 may be enabled to utilize AudioNideo Bridging and/or Audio/video bridging extensions (collectively referred to herein as AVB) for the exchange of multimedia content and associated control and/or auxiliary data.

The PHY devices 110a and 110b may each comprise suitable logic, circuitry, and/or code that may enable communication, for example, transmission and reception of data, between the local link partner 102 and the remote link partner 104. The PHY devices 110a and 110b may support, for example, Ethernet operations. The PHY device s 110a and 110b may enable communications, such as 10 Mbps, 100 Mbps, 1000 Mbps (or 1 Gbps), 2.5 Gbps, 4 Gbps, 5 Gbps, 10 Gbps or 40 Gbps or 100 Gbps for example. In this regard, the PHY devices 110a and 110b may support standard-based data rates and/or non-standard data rates. Moreover, the PHY devices 110a and 110b may support standard Ethernet link lengths or ranges of operation and/or extended ranges of operation. The PHY devices 110a and 110b may enable communication between the local link partner 102 and the remote link partner 104 by utilizing a link discovery signaling (LDS) operation that enables detection of active operations in the other link partner. In this regard the LDS operation may be configured for supporting a standard Ethernet operation and/or an extended range Ethernet operation. The PHY devices 110a and 110b may also support autonegotiation for identifying and selecting communication parameters such as speed and duplex mode.

In various embodiments of the invention, the PHY devices 110a and 110b may comprise suitable logic, circuitry, and/or code that may enable transmission and/or reception at a high (er) data rate in one direction and transmission and/or reception at a low(er) data rate in the other direction. For example, the local link partner 102 may comprise a multimedia server and the remote link partner 104 may comprise multimedia client. In this regard, the local link partner 102 may transmit the multimedia data, for example, to the remote partner 104 at high(er) data rates while the remote link partner 104 may transmit control or auxiliary data associated with the multimedia content at low(er) data rates. In addition, a change in rate such as stepping up in rate or stepping down in rate may occur asymmetrically among the PHY devices 110a and/or 110b which may support energy efficient Ethernet. For example, the PHY device 110a may change its rate based on a change of rate in 110b, however, the PHY device 110a may change to a different rate than the PHY device 110b. Moreover, the PHY devices 110a and 110b may change rates independent of each other, for example, one PHY may change rate while the other does not change rate. Moreover, in some embodiments of the invention, one or more of the PHY devices may step down to a rate of zero.

The data transmitted and/or received by the PHY devices 110a and 110b may be formatted in accordance with the well-known OSI protocol standard. The OSI model partitions operability and functionality into seven distinct and hierarchical layers. Generally, each layer in the OSI model is structured so that it may provide a service to the immediately higher interfacing layer. For example, layer 1, or physical layer, may provide services to layer 2 and layer 2 may provide services to layer 3. The data transmitted may comprise frames of Ethernet media independent interface (MII) data which may be delimited by start of stream and end of stream delimiters, for example. The data transmitted may also comprise IDLE symbols that may be communicated between frames of data, during inter frame gap (IFG)).

In an exemplary embodiment of the invention illustrated in FIG. 1, the hosts 106a and 106b may represent layer 2 and above, the MAC controllers 108a and 108b may represent layer 2 and above and the PHY devices 110a and 110b may represent the operability and/or functionality of layer 1 or the physical layer. In this regard, the PHY devices 110a and 110b may be referred to as physical layer transmitters and/or receivers, physical layer transceivers, PHY transceivers, PHYceivers, or PHY, for example. The hosts 106a and 106b may comprise suitable logic, circuitry, and/or code that may enable operability and/or functionality of the five highest functional layers for data packets that are to be transmitted over the cable 112. Since each layer in the OSI model provides a service to the immediately higher interfacing layer, the MAC controllers 108a and 108b may provide the necessary services to the hosts 106a and 106b to ensure that packets are suitably formatted and communicated to the PHY devices 110a and 110b. During transmission, each layer may add its own header to the data passed on from the interfacing layer above it. However, during reception, a compatible device having a similar OSI stack may strip off the headers as the message passes from the lower layers up to the higher layers.

The PHY devices 110a and 110b may be configured to handle all the physical layer requirements, which include, but are not limited to, packetization, data transfer and serialization/deserialization (SERDES), in instances where such an operation is required. Data packets received by the PHY devices 110a and 110b from MAC controllers 108a and 108b, respectively, may include data and header information for each of the above six functional layers. The PHY devices 110a and 110b may be configured to encode data packets that are to be transmitted over the cable 112 and/or to decode data packets received from the cable 112.

The MAC controller 108a may comprise suitable logic, circuitry, and/or code that may enable handling of data link layer, layer 2, operability and/or functionality in the local link partner 102. Similarly, the MAC controller 108b may comprise suitable logic, circuitry, and/or code that may enable handling of layer 2 operability and/or functionality in the remote link partner 104. The MAC controllers 108a and 108b may be configured to implement Ethernet protocols, such as those based on the IEEE 802.3 standard, for example. Notwithstanding, the invention is not limited in this regard.

The MAC controller 108a may communicate with the PHY device 110a via an interface 114a and with the host 106a via a bus controller interface 116a. The MAC controller 108b may communicate with the PHY device 110b via an interface 114b and with the host 106b via a bus controller interface 116b. The interfaces 114a and 114b correspond to Ethernet interfaces that comprise protocol and/or link management control signals. The interfaces 114a and 114b may be multi-rate interfaces and/or media independent interfaces (MII). The bus controller interfaces 116a and 116b may correspond to PCI or PCI-X interfaces. Notwithstanding, the invention is not limited in this regard.

In operation, PHY devices such as the PHY devices 110a and 110b may conventionally transmit data via a fixed number of channels which may result in network links being underutilized for significant portions of time. When the link partners 102 and 104 first establish a connection, they may exchange some preliminary information and/or training signals. In this regard, the link partners 102 and 104 may negotiate a data rate (e.g., 10 Gbps) and duplex mode (e.g., full-duplex) for communicating with each other. Additionally, in order to establish reliable communications, each of the link partners 102 and 104 may need to adjust various parameters and/or circuitry to account for variables such as the type of cabling over which data is being communicated and environmental conditions (e.g. temperature) surrounding the cabling.

Training may adapt an Ethernet channel to current conditions such that functions such as echo cancellation, far-end crosstalk cancellation, and near-end crosstalk cancellation may be performed.

Link partners may train or refresh circuits and/or update parameters periodically. For example, channels which have been inactive for a period of time may be retrained or refreshed such that corresponding circuitry and/or parameters, which may become outdated over time, enable reliable data communications over the channel(s). Full training steps for a channel that has been silent or inactive may take up to the order of 100 ms or up to the order of seconds. In accordance with various embodiments of the invention, this time may be reduced significantly since the silent or inactive channels may be refreshed and may not need to go through a full training cycle.

Figure 2:
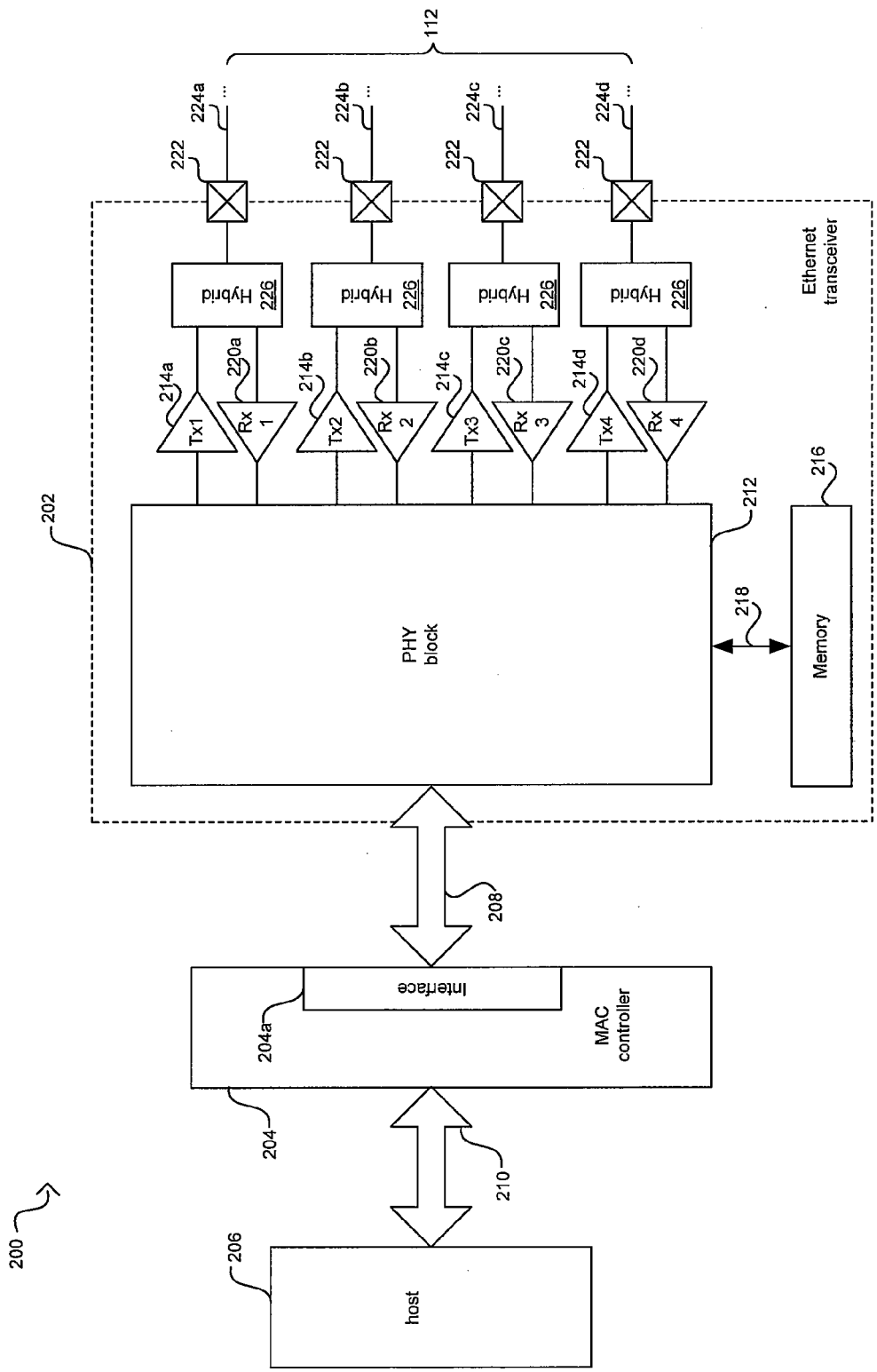
FIG. 2 is a block diagram illustrating an exemplary Ethernet over twisted pair PHY device architecture comprising a physical block, in accordance with an embodiment of the invention.

FIG. 2 is a block diagram illustrating an exemplary Ethernet over twisted pair PHY device architecture, in accordance with an embodiment of the invention. Referring to FIG. 2, there is shown a link partner 200 which may comprises an Ethernet over twisted pair PHY device 202, a MAC controller 204, a host 206, an interface 208, and a bus controller interface 210. The PHY device 202 may be an integrated device which may comprise a physical layer block 212, one or more transmitters 214, one or more receivers 220, a memory 216, a memory interface 218, one or more input/output interfaces 222 and channels 224.

The PHY device 202 may be an integrated device that may comprise a physical layer block 212, one or more transmitters 214, one or more receivers 220, a memory 216, a memory interface 218, and one or more input/output interfaces 222. The operation of the PHY device 202 may be the same as or substantially similar to that of the PHY devices 110a and 110b disclosed in FIG. 1. In this regard, the PHY device 202 may provide layer 1 (physical layer) operability and/or functionality that enables communication with a remote PHY device. Similarly, the operation of the MAC controller 204, the host 206, the interface 208, and the bus controller 210 may be the same as or substantially similar to the respective MAC controllers 108a and 108b, hosts 106a and 106b, interfaces 114a and 114b, and bus controller interfaces 116a and 116b as described in FIG. 1. The MAC controller 204 may comprise an interface 204a that may comprise suitable logic, circuitry, and/or code to enable communication with the PHY device 202 via the interface 208.

The physical layer block 212 in the PHY device 202 may comprise suitable logic, circuitry, and/or code that may enable operability and/or functionality of physical layer requirements. In this regard, the physical layer block 212 may enable generating the appropriate link discovery signaling utilized for establishing communication with a remote PHY device in a remote link partner. The physical layer block 212 may communicate with the MAC controller 204 via the interface 208. In one aspect of the invention, the interface 208 may be a media independent interface (MII) and may be configured to utilize a plurality of serial data lanes for receiving data from the physical layer block 212 and/or for transmitting data to the physical layer block 212. The physical layer block 212 may be configured to operate in one or more of a plurality of communication modes, where each communication mode may implement a different communication protocol. These communication modes may include, but are not limited to, Ethernet over twisted pair standards 10Base-T, 100Base-TX, 1000Base-T, 10GBase-T, and other similar protocols. The physical layer block 212 may be configured to operate in a particular mode of operation upon initialization or during operation. For example, auto-negotiation may utilize the FLP bursts to establish a rate (e.g. 10 Mbps, 100 Mbps, 100 Mbps, or 10 Gbps) and mode (half-duplex or full-duplex) for transmitting information.

The physical layer block 212 may be coupled to memory 216 through the memory interface 218, which may be implemented as a serial interface or a bus. The memory 216 may comprise suitable logic, circuitry, and/or code that may enable storage or programming of information that includes parameters and/or code that may effectuate the operation of the physical layer block 212. The parameters may comprise configuration data and the code may comprise operational code such as software and/or firmware, but the information need not be limited in this regard. Moreover, the parameters may include adaptive filter and/or block coefficients for use by the physical layer block 212, for example.

Each of the transmitters 214a, 214b, 214c, 214d may comprise suitable logic, circuitry, and/or code that may enable transmission of data from the link partner 200 to a remote link partner via, for example, the cable 112 in FIG. 1. The receivers 220a, 220b, 220c, 220d may comprise suitable logic, circuitry, and/or code that may enable receiving data from a remote link partner. Each of the transmitters 214a, 214b, 214c, 214d and receivers 220a, 220b, 220c, 220d in the PHY device 202 may correspond to a channel that may comprise the cable 112. In this manner, a transmitter/receiver pair may interface with each of the channels 224a, 224b, 224c, 224d.

The input/output interfaces 222 may comprise suitable logic circuitry, and/or code that may enable the PHY device 202 to impress signal information onto a physical medium comprising a channel, for example a twisted pair channel comprising the cable 112 disclosed in FIG. 1. Consequently, the input/output interfaces 222 may, for example, provide conversion between differential and single-ended, balanced and unbalanced, signaling methods. In this regard, the conversion may depend on the signaling method utilized by the transmitter 214, the receiver 220, and the type of medium comprising the channel. Accordingly, the input/output interfaces 222 may comprise one or more baluns and/or transformers and may, for example, enable transmission over a twisted pair. Additionally, the input/output interfaces 222 may be internal or external to the PHY device 202. In this regard, if the PHY device 202 comprises an integrated circuit, then "internal" may, for example, refer to being "on-chip" and/or sharing the same substrate. Similarly, if the PHY device 202 comprises one or more discrete components, then "internal" may, for example, refer to being on the same printed circuit board or being within a common physical package.

In operation, the PHY device 202 may be enabled to transmit and receive simultaneously over up to four or more physical links. Accordingly, the link partner 200 may comprise a number of hybrids 226 corresponding to the number of physical links. Each hybrid 226 may comprise suitable logic, circuitry, and/or code that may enable separating transmitted and received signals from a physical link. For example, the hybrids may comprise echo cancellers, far-end crosstalk (FEXT) cancellers, and/or near-end crosstalk (NEXT) cancellers. Each hybrid 226 in the local link partner 300 may be communicatively coupled to an input/output interface 222.

Due to the complex nature of the signal processing involved with for example, duplex, simplex and/or asymmetric communication that may comprise high data rates, various components of the link partner 200 may be "trained" in order to provide reliable communications with a remote link partner. For example, the echo cancellers, FEXT cancellers, and/or NEXT cancellers may comprise one or more configuration parameters which may be determined based exemplary factors comprising environmental conditions, distance to the remote link partner, and data rate. Accordingly, these configuration parameters may need to be configured upon establishing a connection to a remote link partner. Moreover, these parameters may need to be periodically refreshed due to, for example, environmental changes. For example, environmental conditions may comprise temperature changes and/or electromagnetic coupling such as noise received from far-end and/or near-end neighboring cabling known as alien FEXT and alien NEXT respectively. In the event that one or more links 224 may be inactive for some amount of time, environmental conditions may change and training coefficients and/or parameters may need to be updated prior to activating data traffic on the link. Proper training or refreshing of link partners and/or updating of parameters may improve a plurality of problems, for example, bit error rate, packet drops, time to activate a link from a silent state, buffer overflows and/or link drop.

Figure 3:
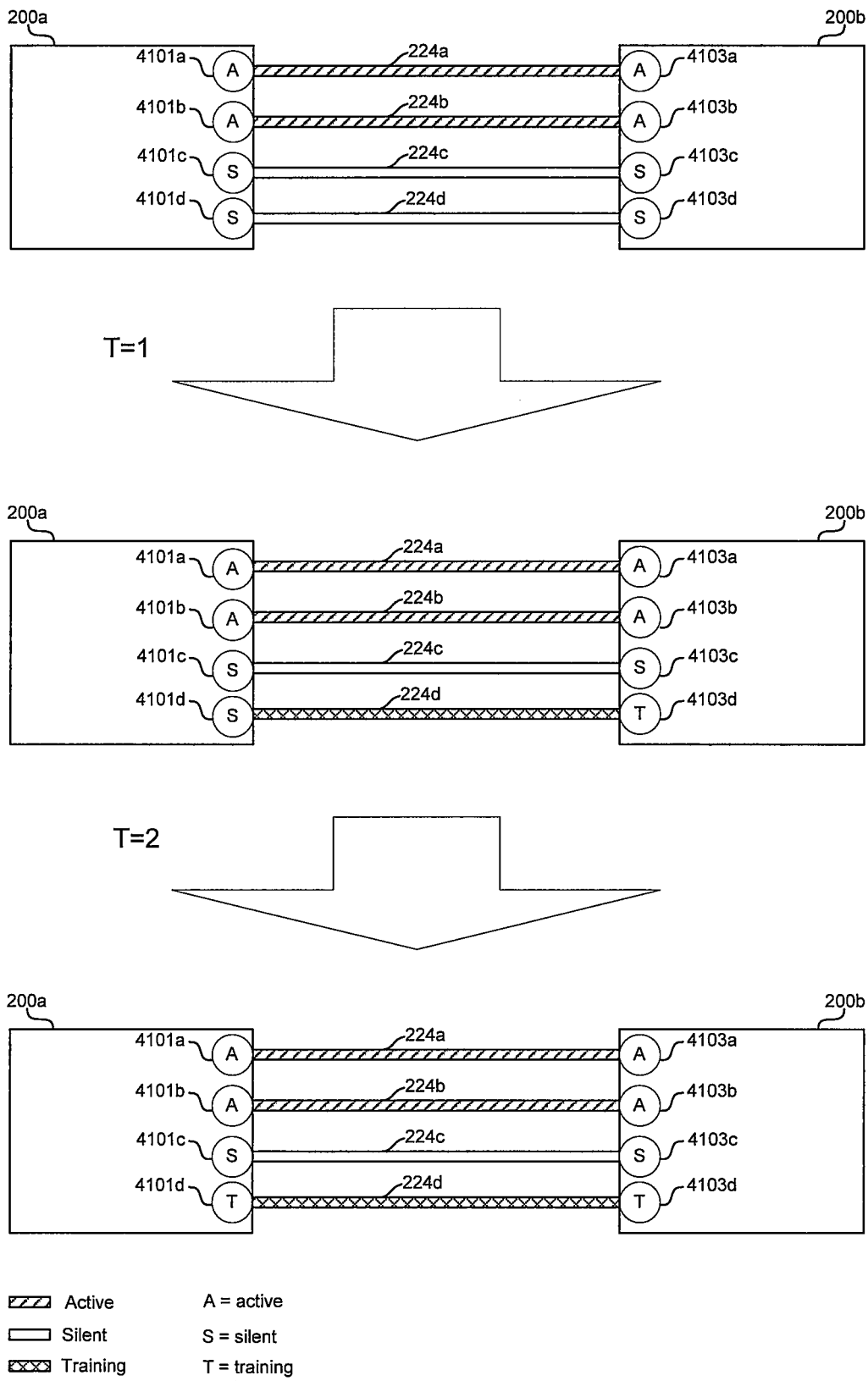
FIG. 3 is a diagram illustrating monitoring training or refreshing activity for a silent channel and determining when to train or refresh link partners and/or update parameters, in accordance with an embodiment of the invention.

FIG. 3 is a diagram illustrating monitoring training or refreshing activity for a silent channel and determining when to train or refresh link partners and/or update parameters, in accordance with an embodiment of the invention. Referring to FIG. 3, there is shown the link partners 200a and 200b which may communicate via one or more of the channels 224a, 224b, 224c, and 224d. The state indicators 4101a, 4101b, 4101c, and 4101d may indicate a state of the link partner 200a associated with the channels 224a, 224b, 224c, and 224d, respectively. The state indicators 4103a, 4103b, 4103c, and 4103d may indicate a state of the link partner 200b associated with the channels 224a, 224b, 224c, and 224d, respectively.

Referring to FIG. 3, prior to time instant T=1, the channels 224a and 224b may be active, according to state indicators 4101a, 4101b, 4103a and 4103b while the channels 224c and 224d may be silent and/or in a lower power state according to state indicators 4101c, 4101d, 4103c and 4103d. In this regard, the link partner 200b and/or 200a may perform training or refreshing of circuitry and/or update parameters associated with the active channels 224a and 224b one or more times such as at periodic intervals, managed time intervals and/or continuous training for example. In addition, link partner 200b may determine when to perform training, refreshing and/or updating parameters for silent channels 224c and/or 224d in one or more of a plurality of ways. For example, silent channel training activity for link partner 200b may be based on active channel training activity. In some embodiments of the invention, link partners may train, refresh and/or update parameters for one or more silent channels at the same time or at different times. Training of link partners for a silent channel may comprise for example, transmission of a pulse or a depleted low density parity check code (LDPC) frame via the silent channel. Moreover, for one or more of the active channels, link partners 200a and/or 200b may comprise silent components. In this regard, the silent components of active channels may train, refresh and/or update parameters.

After time instant T=1 and before time instant T=2, link partner 200b may perform training or refreshing of circuits and/or updating parameters for silent channel 224d according to the state indicator 4103d. Training activity executed during the interval from time instant T=1 until time instant T=2 may comprise a refresh of parameters which may have been configured based on a full training cycle performed for an initial start up of the link partners 200a and/or 200b. The link partner 200a may be enabled operate in a low(er) power state in which it may monitor the silent channels 224c and 224d to determine when the link partner 200b may be performing training and/or updating parameters for the silent channels 224c and 224d. After time instant T=2, the link partner 200a may perform training, refreshing and/or update parameters for the silent channel 224d according to the state indicator 4101d when it is detected that the link partner 200b is training for channel 224d. In this manner, the link partner 200b may act as a sort of "master link partner" to determine when training may be necessary, and the link partner 200a may be enabled to conserve energy and resources.

The link partners 200a and 200b may determine which link partner may operate as a "master link partner" in one or more of a plurality of ways. For example, for 10GBASET, master mode of operation may be assigned to a link partner via configuration bits and/or via auto negotiation. In some embodiments of the invention, a link partner that operates in a master mode of operation for PHY operations and/or for facilitating the timing of transmit and receive operations may also operate as a master for the purpose of initiating training or refreshing activity and/or updating parameters. In other exemplary embodiments of the invention, "master link partner" for the purpose of training or refreshing and/or updating parameters may be determined based on prior events. For example, a partner that initiates an action such as transitioning from an active state to a silent state may, by default, act as the "master link partner". In addition, the link partners may negotiate with regard to which link partner may operate as the "master link partner" via one or more of in-band signaling, out-of-band signaling and packet data. Additionally, a timer that may be set for a fixed duration or a programmable duration for example, may be utilized in the event that a train or refresh trigger is not received by the link partner operating in a "slave" mode. The timer may begin counting based on a change of state in the "master link partner" and/or based on training or refreshing on the "master link partner". In some embodiments of the invention, the timer may begin counting based on observations made in layers above the PHY, for example, when data rates are modified and/or asymmetric data rates change. A change in data rate symmetry may alter environmental conditions such as noise on the link.

In some embodiments of the invention, the link partners 200a and 200b may be enabled to change roles with regard to which link partner may operate as "master link partner" and which may monitor training activity by the "master link partner". The invention is not limited with regard to the criteria utilized for determining when to initiate training activity for the active channels 224a and 224b and/or for the silent channels 224c and 224d by the "master link partner" 200b. In this regard, any suitable method for determining when to train, refresh and/or update training parameters by the "link master" 200b may be utilized. For example, the master link partner may determine when to train, refresh and/or update parameters based on fixed times, periodic or aperiodic time intervals, a random and a pseudorandom timer, one or more physical conditions within said Ethernet link environment such as noise, temperature level, cable type and/or cable length for example, communication from a corresponding link partner and/or based on programming from, for example, a layer above the physical layer, for example. Moreover, the invention is not limited with regard to the ratio of the number of active channels to silent channels at any given time.

Figure 4:
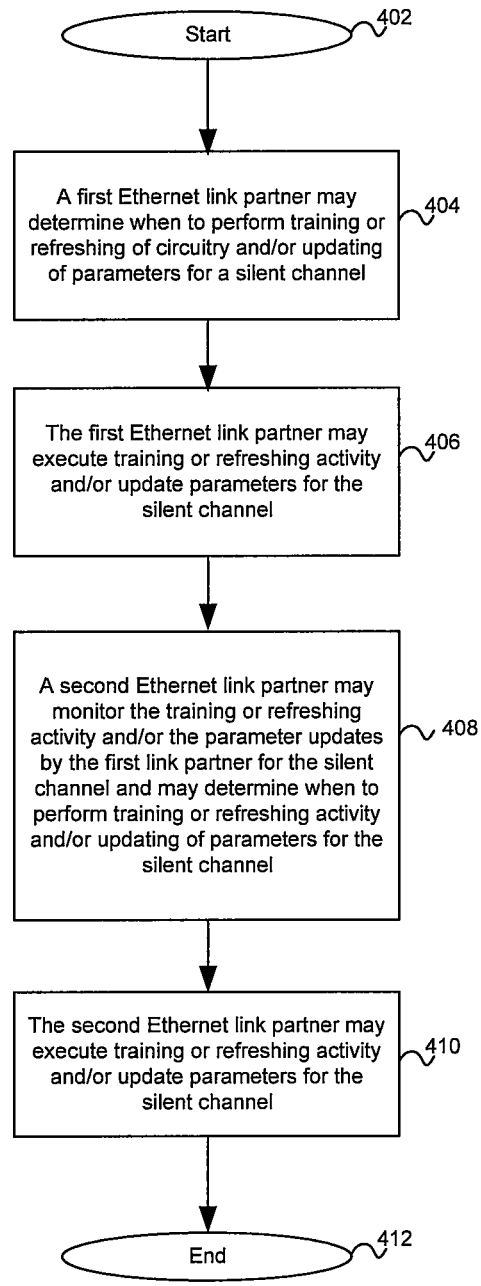
FIG. 4 is a flow chart illustrating exemplary steps for determining when to train or refresh silent channel link partners and/or update parameters, in accordance with an embodiment of the invention.

FIG. 4 is a flow chart illustrating exemplary steps for determining when to train or refresh silent channel link partners and/or update parameters, in accordance with an embodiment of the invention. Referring to FIG. 4, after start step 402, in step 404, a first Ethernet link partner 200b may determine when to perform training or refreshing circuitry and/or updating parameters for a silent channel such as channel 224d. In step 406, the first Ethernet link partner 200b may execute training or refreshing activity and/or may update parameters for the silent channel 224d. In step 408, a second Ethernet link partner 200a may monitor the training, refreshing and/or updating activity by link partner 200b for the silent channel 224d and may determine when to perform training, refreshing and/or updating activity for the silent channel 224d. In step 410, the Ethernet link partner 200a may execute training or refreshing of circuitry and/or updating parameters for the silent channel 224d. The exemplary steps may end at step 412.

In an embodiment of the invention, in an Ethernet link 112, a first link partner 200b and a second link partner 200a may be communicatively coupled via one or more channels such as 224a, 224b, 224c and 224d. Accordingly one or more of the channels such as 224a and 224b may be active and/or one or more of the channels such as 224c and 224d may be silent or set to a lower power. The corresponding second link partner 200a may determine when to perform training and/or update one or more parameters for the one or more channels 224a, 224b, 224c and 224d based on monitoring training activity and/or parameter updates controlled by the first link partner 200b for the one or more channels 224a, 224b, 224c and 224d. The corresponding second link partner 200a may then perform training and/or update parameters for the one or more channels 224a, 224b, 224c and 224d. In this regard, the corresponding second link partner 200a may monitor training and/or parameter update activity controlled by the first link partner 200b via the one or more channels 224a, 224b, 224c and 224d. In addition, the link partners 200a and 200b may utilize one or more of in-band signaling, out-of-band signaling and packet data to communicate which link partner may be the controlling or "master link partner" and which link partner may monitor training activity. The link partners for the one or more channels 224a, 224b, 224c and 224d may be trained and/or parameters may be updated for one or more of an echo canceller, a far-end crosstalk canceller and a near-end crosstalk canceller.

In accordance with an embodiment of the invention, for one or more channels on an Ethernet link such as 224a, 224b, 224c and 224d that couple a first link partner 200b to a second link partner 200a, determining whether one of the first link partner 200b and the second link partner 200a has performed training or refreshing of circuitry and/or updating one or more parameters for the one or more channels 224a, 224b, 224c and 224d. In addition, based on the determination, if one of the link partners 200a and/or 200b has performed the training, refreshing and/or updating and another of the link partners 200a and/or 200b has not performed the training, refreshing and/or updating, then the other of link partners 200a and/or 200b may perform training or refreshing of circuitry and/or updating one or more parameters for the one or more channels 224a, 224b, 224c and 224d. In this regard, one or more of an echo canceller, a far-end crosstalk canceller and a near-end crosstalk canceller for the one or more channels 224a, 224b, 224c and 224d may be configured based on the link partner training, refreshing and/or updating of at least one parameter.

The first link partner 200b may monitor the second link partner 200a and/or the second link partner 200a may monitor the first link partner 200b to determine whether one of the first link partner 200b and the second link partner 200a has performed the training, refreshing and/or updating for one or more of the channels 224a, 224b, 224c and 224d. The one or more channels 224a, 224b, 224c and 224d may comprise at least one silent channel and/or may comprise at least one active channel. The first link partner 200b and the second link partner 200a may communicate with each other via one or more of in-band signaling and out-of-band signaling to determine which of a corresponding one of the first link partner 200b and the second link partner 200a may monitor and which may control or initiate the training, refreshing and/or updating operation on the one or more channels 224a, 224b, 224c and 224d. One of the link partners 200a and 200b that may control or initiate the training, refreshing and/or updating may be assigned a master mode of operation. Moreover, triggering the training, refreshing and/or updating for the monitoring link partner 200a or 200b may be based on a timer. In some embodiments of the invention, timing may begin based on the training, refreshing and/or updating of the controlling or initiating link partner.

Another embodiment of the invention may provide a machine-readable storage, having stored thereon, a computer program having at least one code section executable by a machine, thereby causing the machine to perform the steps as described herein for monitoring activity of a remote link partner to trigger training of Ethernet channels to support energy efficient Ethernet networks.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
    performing a plurality of steps by one or more circuits in a first link partner wherein said first link partner is coupled to a second link partner via an Ethernet link comprising a plurality of channels;
    said plurality of steps comprising:
        transitioning a first of said plurality of channels from an active state to a low power state having a reduced transmission rate as compared to a second of said plurality of channels that remains in said active state;
        while said first of said plurality of channels is in said low power state, determining whether said second link partner has performed one or both of training and refreshing parameters for said first of said plurality of channels;
        transitioning said first of said plurality of channels from said low power state to a training state when it is determined that said second link partner has performed one or both of training and refreshing parameters for said first of said plurality of channels;
        while said first of said plurality of channels is in said training state, performing one or both of training and refreshing parameters for at least a portion of said one or more circuits used by said first of said plurality of channels, wherein said performing one or both of training and refreshing parameters for at least said portion occurs prior to an occurrence of a determined need to transition said first of said plurality of channels to said active state;
        after performing one or both of training and refreshing parameters for at least said portion of said one or more circuits used on said first of said plurality of channels, transitioning said first of said plurality of channels from said training state to a low power state with updated parameters and remaining in said low power state with updated parameters until said occurrence of said determined need; and
        transitioning said first of said plurality of channels from said low power state with updated parameters to said active state upon said occurrence of said determined need.

2. The method according to claim 1, wherein said parameters are used by one or more of an echo canceller, a far-end crosstalk canceller, and a near-end crosstalk canceller for said first of said plurality of channels.

3. The method according to claim 1, wherein said first link partner monitors said second link partner, for said determination of whether said second link partner has performed one or both of said training and refreshing parameters for said first of said plurality of channels.

4. The method according to claim 1, wherein said first link partner communicates with said second link partner via one or more of in-band signaling and out-of-band signaling to determine which of said first link partner and said second link partner operates as a master link partner that determines when to train or refresh parameters for said first of said plurality of channels while said first of said plurality of channels is in said low power state.

5. The method according to claim 1, comprising assigning a master mode of operation to said second link partner to perform a determination of when to train or refresh parameters for said first of said plurality of channels while said first of said plurality of channels is in said low power state.

6. The method according to claim 1, comprising triggering one or both of said training and said refreshing based on a timer.

7. A non-transitory machine-readable storage having stored thereon, a computer program having at least one code section for networking, the at least one code section being executable by a machine for causing the machine to perform steps comprising:
    transitioning a first of a plurality of channels from an active state to a low power state having a reduced transmission rate as compared to a second of said plurality of channels that remains in said active state
    while said first of said plurality of channels is in said low power state, determining by said first link partner, whether said second link partner has performed a refreshing of parameters for said first of said plurality of channels that was initially trained while said first of said plurality of channels were in an active state;

transitioning said first of said plurality of channels from said low power state to a training state when it is determined that said second link partner has performed a refreshing of parameters for said first of said plurality of channels;

while said first of said plurality of channels is in said training state, performing a refreshing of parameters used by one or more circuits that supports said first of said plurality of channels, wherein said performing a refreshing of parameters used by one or more circuits that supports said first of said plurality of channels occurs prior to an occurrence of a determined need to transition said first of said plurality of channels to said active state;

after performing said refreshing parameters, transitioning said first of said plurality of channels from said training state to a low power state with refreshed parameters and remaining in said low power state with refreshed parameters until said occurrence of said determined need; and transitioning said first of said plurality of channels from said low power state with refreshed parameters to said active state upon said occurrence of said determined need.

8. The non-transitory machine-readable storage according to claim 7, wherein said at least one code section comprises code for enabling refreshing of parameters for one or more of an echo canceller, a far-end crosstalk canceller, and a near-end crosstalk canceller for said one or more channels.

9. The non-transitory machine-readable storage according to claim 7, wherein said first link partner monitors said second link partner for said determination of whether said second link partner has performed said refreshing of parameters for said first of said plurality of channels.

10. The non-transitory machine-readable storage according to claim 7, wherein said first link partner communicates with said second link partner via one or more of in-band signaling and out-of-band signaling to determine which of said first link partner and said second link partner operates as a master link partner that determines when to refresh parameters for said first of said plurality of channels in said low power state.

11. The non-transitory machine-readable storage according to claim 7, wherein said at least one code section comprises code for assigning master mode of operation to said second link partner.

12. The non-transitory machine-readable storage according to claim 7, wherein said at least one code section comprises code for triggering said refreshing, based on a timer.

13. A system for networking, the system comprising:
one or more circuits for use in a first link partner wherein said first link partner is coupled to a second link partner via an Ethernet link comprising one or more channels, said one more circuits being operable to:

transition a first of said one or more channels from an active state having a first transmission rate to a low power state having a second transmission rate lower than said first transmission rate;

while said first of said one or more channels is in said low power state, determine whether said second link partner has performed a refreshing of parameters for said first of said one or more channels, said parameters being initially determined while said first of said one or more channels was in said active state;

transition said first of said one or more channels from said low power state to a training state when it is determined that said second link partner has performed said refreshing of parameters for said first of said one or more channels;

while said first of said one or more channels is in said training state, refresh said parameters for said first of said one or more channels in said low power state prior to an occurrence of a determined need to transition said first of said one or more channels to said active state;

after performing said refresh, transition said first of said one or more channels from said training state to a low power state with refreshed parameters and remain in said low power state with refreshed parameters until said occurrence of said determined need; and transition said first of said one or more channels from said low power state with updated parameters to said active state upon said occurrence of said determined need.

14. The system according to claim 13, wherein said parameters are used by one or more of an echo canceller, a far-end crosstalk canceller, and a near-end crosstalk canceller.

15. The system according to claim 13, wherein said first link partner monitors said second link partner for said determination of whether said second link partner has performed said refreshing.

16. The system according to claim 13, wherein said one or more channels comprises at least one active channel.

17. The system according to claim 13, wherein said first link partner communicates with said second link partner via one or more of in-band signaling and out-of-band signaling to determine which of said first link partner and said second link partner operates as a master link partner that determines when to refresh parameters for said first of said one or more channels in said low power state.

18. The system according to claim 13, wherein said one or more circuits enables assignment of a master mode of operation to said second link partner.

19. The system according to claim 13, wherein said one or more circuits enables triggering of said refreshing, based on a timer.

* * * * *